| United States Patent [19] | [11] | 4,317,807 |
|---|---|---|
| Gielly et al. | [45] | Mar. 2, 1982 |

[54] AIR COOLING DURING THE PRODUCTION OF PHOSPHORIC ACID

[75] Inventors: Jean-Francois Gielly, Rouen; Dominique Lizée, Pelussin; Bernard Sohier, Rouen, all of France

[73] Assignee: Rhone-Poulenc Industries, Paris, France

[21] Appl. No.: 158,707

[22] Filed: Jun. 12, 1980

[30] Foreign Application Priority Data

Sep. 26, 1979 [FR] France ................ 79 23895

[51] Int. Cl.³ .................. C01B 25/16; B01D 53/34
[52] U.S. Cl. .................. 423/320; 423/319; 423/166; 422/168
[58] Field of Search ........ 423/319, 320, 166; 422/168, 173, 200

[56] References Cited

U.S. PATENT DOCUMENTS 3,499,731  3/1970  Sackett ............... 422/168
4,075,305  2/1978  Geilly ................ 423/320

FOREIGN PATENT DOCUMENTS 553924  7/1932  Fed. Rep. of Germany ...... 423/320
539830  7/1977  U.S.S.R. .

*Primary Examiner*—O. R. Vertiz
*Assistant Examiner*—Gregory A. Heller
*Attorney, Agent, or Firm*—Burns, Doane, Swecker & Mathis

[57] ABSTRACT

The air cooling of exothermic reaction vessels is improved by providing a cooling air recirculation loop wherein substantial amounts of the cooling air are recycled through the system with but a small fraction thereof being discharged to ambient, and after the condensable/soluble off-gases are depleted therefrom and with addition thereto of but minor amounts of additional feed air. Such technique is well suited for controlling the temperature of the digestion of phosphate rock with sulfuric acid, in the known wet-process for the production of phosphoric acid.

23 Claims, 3 Drawing Figures

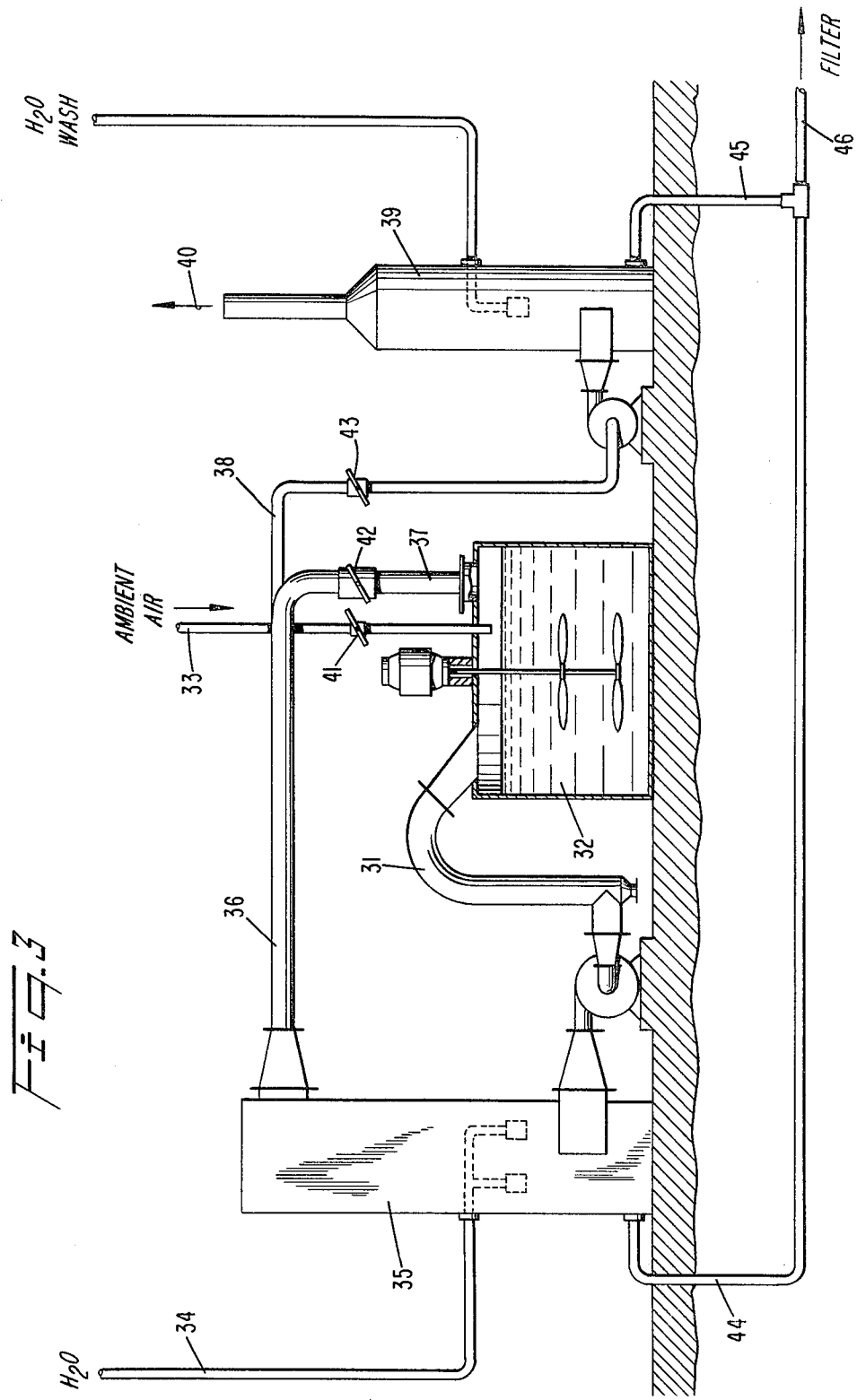

AIR COOLING DURING THE PRODUCTION OF PHOSPHORIC ACID

BACKGROUND OF THE INVENTION

1. Field of the Invention

The present invention relates to the control of the exothermic heat of reaction generated in an exothermal reactor system and, more especially, to the removal of the exothermic heat of reaction generated in a large scale exothermal reactor system such as a digester for the production of wet-process phosphoric acid.

2. Description of the Prior Art

It is well known to the art of wet-process phosphoric acid production, for example, that relatively large quantitites of the exothermic heat of reaction must be exactingly removed in order to maintain the desired temperature in the reactor/digester system. And this is typically sought to be accomplished either by circulating a fraction of the reaction slurry through a vacuum cooler (compare U.S. Pat. Nos. 3,257,168, 3,472,619 and 3,552,918) or by maintaining the reactor itself under vacuum (compare U.S. Pat. Nos. 3,416,889, 3,522,003, 3,522,004, 3,666,413 and 3,917,457).

Moreover, due to certain technical problems associated with the above and the energy efficiency thereof, it too is known to effect such cooling by blowing air over the surface of the reaction mixture in the reactor.

For a more detailed description of the temperature control problem and the various proposed solutions thereof, see A. V. Slack, *Phosphoric Acid,* 1, Part I, pp. 227-231, Marcel Dekker, Inc., New York (1968).

Further, the air cooling alternative avoids such disadvantages of the use of a vacuum cooler as scaling, the need for periodic washing, the creation of a temperature gradient detrimental to good crystallization; air cooling similarly avoids such disadvantages of maintaining the reactor under vacuum as the requirement for airtightness and concomitant difficulties in apparatus construction, as well as the increased size of the installations by reason of the amount of gaseous species which do not condense.

In contrast, the cooling air charged with water vapor, carbon dioxide, fluorine, etc. (compare A. V. Slack, *Phosphoric Acid,* 1, Part II, pp. 744-745, Marcel Dekker, Inc. New York (1968)), must be scrubbed before being discharged back into the atmosphere; such treatment mandates additional capital investment due to the high flow rates involved and also because of the need for extensive purification which may necessitate the use of several installations, giving rise to the expenditure of additional energy, and by reason of the discharge of gases which are still hot, heat loss also characterizes the air cooling system.

SUMMARY OF THE INVENTION

Accordingly, a major object of the present invention is the provision of an improved air cooling system for reactor temperature control, while at the same time maintaining the advantages of air cooling over the known vacuum cooling approaches.

Briefly, the present invention features a recycling of substantial amounts of the cooling air, and whereby the volume of air which must be treated/purified prior to its discharge back into the atmosphere is markedly reduced and capital investment and energy requirements are greatly reduced.

BRIEF DESCRIPTION OF THE DRAWINGS

FIG. 3 is a schematic/diagrammatic representation of yet another apparatus/process for the improved air cooling of a wet-process phosphoric acid digester according to the invention.

DETAILED DESCRIPTION OF THE INVENTION

Figure 1:
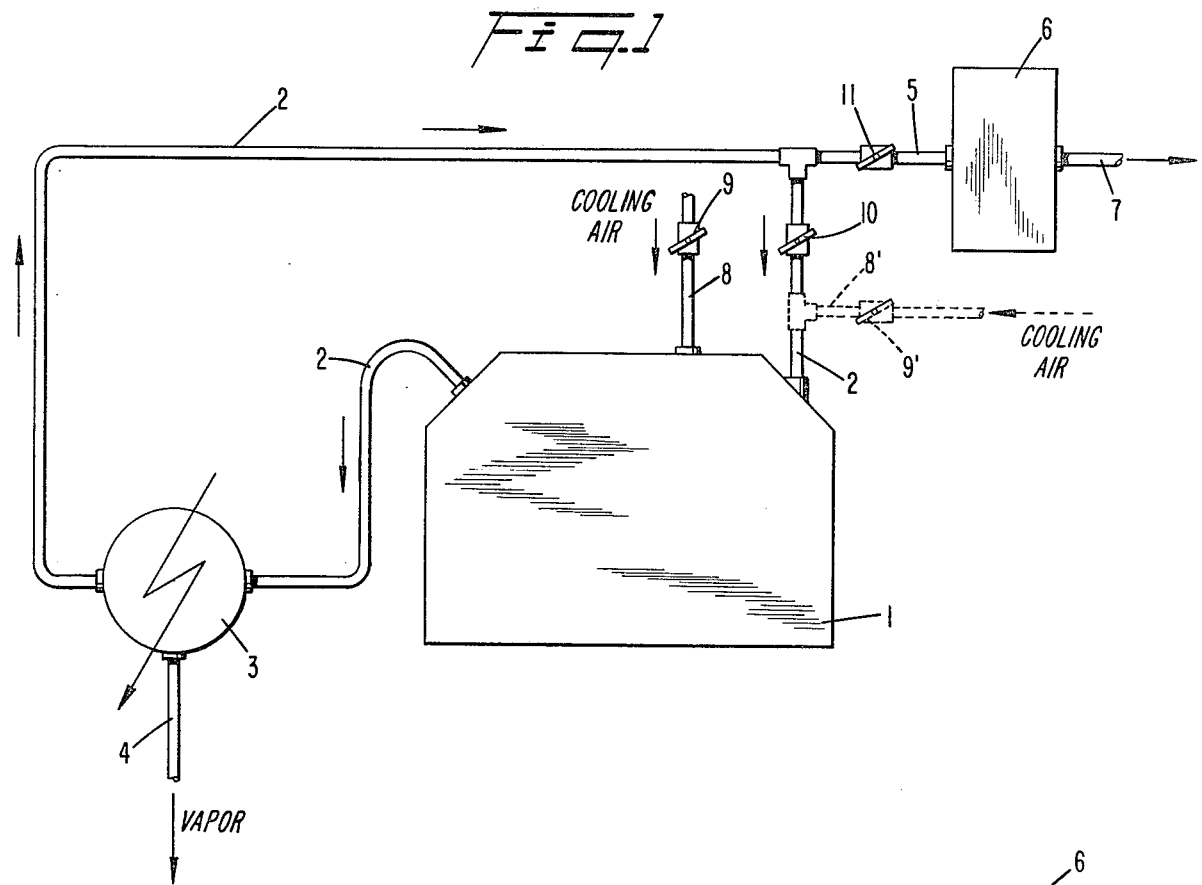
FIG. 1 is a schematic representation of apparatus/process for the improved air cooling of a wet-process phosphoric acid digester according to the invention.

More particularly according to the invention, there is thus enabled the continuous temperature control of an exothermal reactor system via air cooling, by circulating a stream of air over the surface of the exothermic reaction medium and thus entraining and ultimately essentially completely removing all evolved vapors from the system.

Consistent with this invention, an air circulation loop is established which includes directing the cooling air stream through the reactor and over the surface of the exothermic reaction medium, whereby the air attains a temperature closely approximating the temperature of and within the reactor and is concomitantly saturated with any evolved vapors; subsequently, the cooling air saturated with such vapor is treated by any suitable means effecting the elimination of the entrained vapor from the circulation loop, whereupon at least a portion of the air treated in this manner is reintroduced or recycled over the surface of the reaction mixture, where it is again saturated with the evolved vapors, while the remaining portion of the cooling air is discharged, advantageously after purification, into the atmosphere.

The cooling air which has been treated to rid same of its content of evolved vapors is reintroduced or recycled over the surface of the reaction mixture by combining same with a supply of fresh air, typically taken from the ambient atmosphere, such as to provide the volume necessary.

The remaining portion of the air in the loop is treated, e.g., purified and cooled, prior to its discharge back into the ambient atmosphere.

The elimination or removal of the entrained vapors from the circulation loop can be effected by any known method.

In a preferred embodiment of the invention, the vapors are eliminated by first condensing same and then drawing off the condensate. The condenser also performs the added function of cooling the circulating air. The effluent air exiting the condenser remains saturated, but at a temperature considerably less than that of the gases issuing from the reactor; it thus contains much less vapor and is capable of being further charged with vapors upon its subsequent recirculation through the reactor. The amount of vapor the recycled air is capable of further entraining, or becoming saturated therewith, is determined by its saturation point at the temperature of the reactor, an example of which being presented hereinbelow.

The air stream exiting the condenser is split. The quantity or amount of same diverted for recycling increases with increasing efficiency of the condenser. The flow rates are controlled by any known means.

A water cooled, direct contact condenser of any known type, cocurrent or countercurrent, is preferred, particularly for the manufacture of phosphoric acid. A countercurrent condenser is more preferably employed.

It is advantageous to use a vacuum cyclone column without liquid recirculation.

The sprinkler water and the condensed vapor are eliminated together.

The condenser is provided with a water supply. The rate of flow of the water spray and the temperature thereof are the factors which affect the efficiency of the condenser; it should be understood that low temperatures and high flow rates favor enhanced condensation.

The cooling air exiting the reactor proper contains uncondensable compounds; thus, gases emitted by the decomposition of phosphate minerals often contain carbon dioxide originating from carbonate gangue, in varying amounts, depending upon the origin of the phosphate. The accumulations of these compounds within the loop is prevented by the discharge into the atmosphere of a portion of the cooling air.

The largest portion of the gaseous impurities deriving from the phosphate minerals consists of fluorine compounds. These compounds are contacted with water in the condenser, are solubilized to a large degree and then discharged in and with the wash solution. The condenser thus has a third function, i.e., that of purification.

The proportion of the recirculated air thus also depends on the amount of uncondensable compounds and of fluorine compounds present in the gaseous mixture evolved from the phosphate decomposition reaction. It further depends on the efficiency of the condenser, noted hereinabove, and also upon the availability of cold water.

Depending upon any particular case, the available water may be supplied by waste water (a description of which being given in A. V. Slack, pp, 727 to 731, supra), by river water or, in general, any water supply that may be separately cooled and reintroduced or recycled into the installation.

In any event, the elimination or removal of the evolved vapors by condensation and/or scrubbing is accompanied by concomitant purification of the gases, the soluble compounds being partially eliminated in and with the water of condensation.

The effluent gases exiting the condenser but which are not recirculated or recycled are discharged into the atmosphere after washing, which, by means of an additional purification step, enables compliance with all prevailing environmental pollution standards.

The washing may be carried out in any apparatus per se known to the art, such as a packed column or a cyclone vacuum column supplied with water, either with or without recycling. The gases issuing from this final washing sequence have also had the benefit of additional cooling.

The water emanating from the condenser and the final washer are used in another section of the overall installation, or facility, giving rise to those advantages described hereinbelow. Solubilized or entrained impurities do not cause further disadvantages.

An installation for the production of wet-process phosphoric acid conventionally comprises a reactor or a reaction system for decomposition, and a filtration and washing system, typically under vacuum.

In such an installation, the water required consists of:

[i] the so-called "process" water, used for the methodical washing of the calcium sulfate cake; it is known that hot water preferably should be utilized;

[ii] the water for repulping of the resultant gypsum;

[iii] the water from the condenser of the vacuum pump of the filter; and

[iv] the cooling water of the accessory appliances (the blower, the vacuum pump of the filter).

These water requirements may be classified in three categories:

(a) hot recirculated water for the "process" water;

(b) water recirculated for repulping and for the condenser of the filter vacuum pump; and (c) the cooling water proper, for cooling the aforesaid accessory appliances.

The process of the invention is notable in providing the useful water originating from the condenser, which is heated by heat exchange with the hot gases emanating from the digestion vat. It is advantageous to use this water as the "process" water for the washing of the $CaSO_4$ cake.

Referring specifically to the figures of drawing, in FIG. 1 is shown a reactor/digester 1 cooled by means of circulating air 2, which when exiting said reactor 1 is saturated with the off-gases from digestion. The flow 2 which is circulated by any suitable means or accessory (not shown) such as, for example, a blower, is cycled through a separator 3 and a fraction of the entrained vapors separated thereon, which fraction is drawn off via line 4 and may be diverted for use in another section (not shown) of the installation. A portion of the flow 2 exiting the separator 3, and containing a small amount of entrained vapor, is recycled to the reactor 1. The remaining portion of the air stream, designated as 5, is conveyed through a purification means 6 prior to being discharged or vented back into the atmosphere, via line 7.

Additional or supplementary cooling air is introduced into the cycle either via line 8 or 8', with all of the respective flow rates being controlled by any known means, e.g., valve means, the same being hereby represented as 9, 9', 10 and 11.

The off-vapor is eliminated or removed from circulation by any known means, such as, for example, by contacting the air charged or saturated with the vapor with concentrated sulfuric acid.

In particular, when the process of the invention is applied to a system for phosphate decomposition, the sulfuric acid intended for the digestion reactor is utilized in the separator 3, such as a drying column, followed by cooling. The coolant removes the heat of dilution and may serve as a source of heat. The sulfuric acid, emanating therefrom in dilute state, is introduced by any known means to the digestion reaction medium.

In a preferred embodiment of the invention, wherein the vapor is eliminated by condensation, the separator 3 is a countercurrent condenser. An advantage of this particular apparatus is that the heat values otherwise lost are recovered in the form of hot process water, without the need for additional expenditure of fuel.

Figure 2:
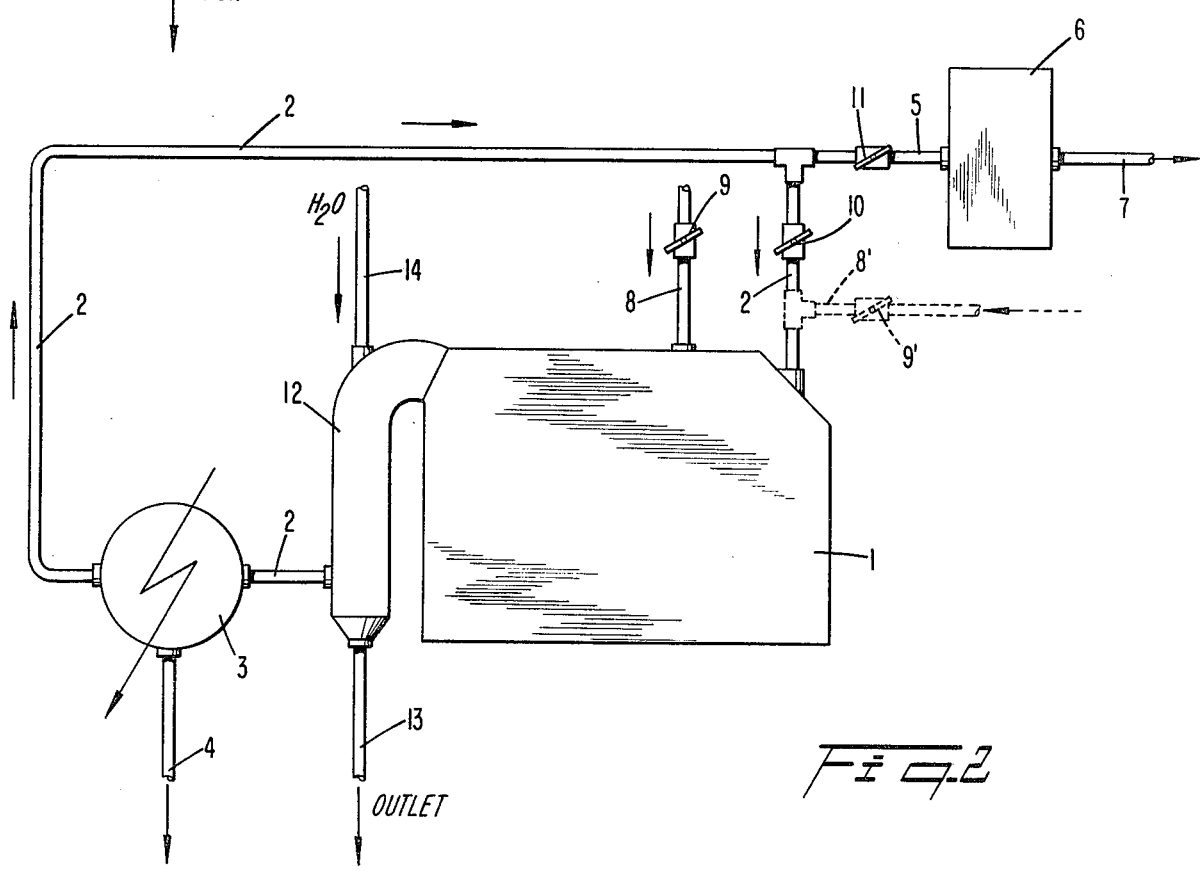
FIG. 2 is a schematic representation of another apparatus/process for the improved air cooling of a wet-process phosphoric acid digester according to the invention.

The process of the invention offers yet another advantage: when very hot water is needed the installation shown in FIG. 2 is utilized as an alternative. To the installation schematically depicted in FIG. 1, at the outlet of the reactor 1 and upstream of the condenser 3, a preliminary treatment device 12, having an outlet 13, is interposed.

In this manner, the heat exchange and/or mass transfer within the system is increased by improving the interphase surface and the time of the gas-liquid contact. The treatment device 12 is supplied with water via line 14. The water collected at 13 is very hot; it may advantageously be used as process water. Furthermore, this embodiment provides the advantage of avoiding the entrainment of $P_2O_5$ in the form of vesicles; same are returned to the reactor by means of systemmatic countercurrent washing at the filter level.

It is of advantage to utilize as the preliminary treatment device the gas-liquid phase contactor described in Sohier copending application, Ser. No. 143,043, filed Apr. 23, 1980, and assigned to the assignee hereof, as will be seen from the examples to follow. Such advantage resides in the fact that the efficiency of the assembly is increased at a small investment cost.

In a general embodiment of the invention, the efficiency of the different types of condensers was measured, both in countercurrent and in cocurrent operation.

A mixture of gases exiting the reactor at 68° C. is treated with 1,000 m³/h spray of water at a temperature of 32° C.:

|  | Outlet Temperature | Air Issuing at 68° C. | Volume of Gas discharged |
| --- | --- | --- | --- |
| [a] countercurrent | 44° C. | 363,000 m³/h | 27,700 m³/h |
| [b] countercurrent | 47° C. | 390,000 m³/h | 30,500 m³/h |
| [c] cocurrent | 56° C. | 557,000 m³/h | 48,000 m³/h |

Advantageously, a countercurrent sprinkler device described in French Application No. 75/33.658 (French Pat. No. 2,330,435) is used, and wherein the sprinkler liquids are not recycled. This provides the advantages of countercurrent contact, slight loss of pressure, limited scaling, and, by virtue of the vacuum column, atomizers having large diameters and a devesiculation zone.

To effect the second washing or absorption, any device per se known may be used, either with or without recirculation of the liquid and having an adequate number of transfer units. A packed column or a cyclone vacuum column combined with a venturi may be used, such as those featured in French Application No. 77/20097 (French Pat. No. 2,395,771).

The cost of this second washing is significantly reduced with respect to the known methods; thus, for example, to conform to the same environmental discharge standards, an assembly of devices having a number of transfer units of 5.22 has been utilized while according to the invention, the same result is obtained with a substantially lower flow rate (example of which to follow) and with a single device having a number of transfer units of 3.14. Furthermore, this second device utilizes industrial water only and no extraneous reagents.

In order to further illustrate the present invention and the advantages thereof, the following specific examples are given, it being understood that same are intended only as illustrative and in nowise limitative.

EXAMPLE 1

The phosphate digestion reactor of the type shown schematically/diagrammatically in FIG. 3 was cooled by circulating a 363,000 m³/h air stream 31 over the surface of a digester reactor vat 32, equipped with means for agitation, as illustrated. The inlet air which entered via line 33 was at a temperature of 32° C. and at the outlet of the reactor 32 was at a temperature of 68° C. Same was washed with water having a temperature of 32° C., such water being introduced through line 34 and countercurrently sprayed through the circulating gases in a condenser 35. The air exiting the condenser at 36 was at a temperature of 44° C. At point 37, a flow corresponding to 90% in mass and in dry air, to the total amount thereof, was recycled and same was combined with a flow of ambient air 33 being fed into the installation. The remaining flow 38, approximately 10% of the total was washed in column 39 with a water spray, and ultimately the scrubbed gas was vented to ambient via outlet 40 at a temperature of 32° C. and at an approximate flow rate of 30,000 m³/h. The control of the flow rates of the respective streams at 33, 37 and 38 was effected by means of the dampers or valves 41, 42 and 43.

The energy required for the two scrubbings, one of 363,000 m³/h at 150 mm of water and the other 30,000 m³/h at 400 mm of water, was approximately 250 kw; the scrub waters collected and drawn off through lines 44 and 45 were combined and conducted via line 46 to the filter, not shown; same were at a temperature of approximately 60° C.

COMPARATIVE EXAMPLE 1

In order to evaluate the amount of energy expended, the procedure of Example 1 was compared with a known installation comprising a series of venturi washers, which treat the entire flow of the cooling gas, first with water and then with sodium hydroxide.

The gas discharged back into the atmosphere was at a temperature of 40°–50° C. Apparatus requirements were established to treat 300,000 m³/h of gas at 560 millimeters of water and the amount of energy required was 630 kw.

Furthermore, the volume of air discharged to ambient was ten times greater than that of Example 1; its temperature was too high to meet the effluent specifications of 10 g fluorine per ton of $P_2O_5$ produced.

In order to validly compare the absorption occurring in the aforesaid two installations, it will be seen that in both cases the first washing was effected in a cyclone column without recycling, having a number of transfer units of 1.5, while for the second washing, a number of transfer units of 5.22, was needed in the case of the Comparative Example 1; the contrast, in the process according to the invention, Example 1, a number of transfer units of 3.14 suffices for the second washing, and no sodium hydroxide was required or consumed.

EXAMPLE 2

The amount of vapors entrained in the air stream in Example 1 was measured: a 249,000 m³ stream of air, which was saturated with evolved off-gases at 44° C., and still entraining 15,400 kg of uncondensed water, was recirculated; this was supplemented by a flow of atmospheric air at a temperature of 32° C. and 90% humidity, at a rate of flow of 25,000 m³/h, bearing 760 kg of water. At the reactor outlet, the circulating air entrained 58,950 kg water; it was at a temperature of 68° C., at 90% humidity and at a flow rate of 363,000 m³/h. Same evaporated 42,790 kg water from the reactor.

EXAMPLE 3

The pretreatment embodiment shown in FIG. 2 was effected. Gases evolving from a phosphate digestion reactor at a rate of approximately 170,000 m³/h were treated. The gases were saturated at 65° C.; same were conveyed by a blower into a purification device comprising a wash column with two stages of atomization.

In order to obtain very hot "process" water and to improve the yield of the washing process, the purification device was supplemented by a scrubber described in copending application, Ser. No. 143,043, supra, the rate of spray of the scrubbing water being 150 m³/h at 30° C.

The wash water was collected at approximately 60° C., while the gases exiting the column were at a temperature of 40°–45° C., same contained less than 40 kg/day of fluorine for a production of 650 t/day of $P_2O_5$.

The process of the invention may be advantageously applied to the manufacture of phosphoric acid. Particularly economical production may be obtained by the calcium sulfate dihydrate or gypsum process, with the repulping of the residual gypsum, which is then transported into a spreading zone, where it is decanted and the cooled water recycled.

The invention finds other applications in industry, in any reaction system where air cooling is used.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. In a process for the control of the exothermic heat of reaction generated during the production of wet-process phosphoric acid in an exothermal reaction system and including blowing a stream of cooling air onto and over the surface of an exothermal reaction medium that is the digestion reaction of phosphate rock with sulfuric acid confined within an exothermal reaction zone and therein entraining the vapors and off-gases evolved from such exothermal reaction medium, the improvement which comprises (i) establishing a continuous cooling air recirculation loop and continuously recycling the cooling air therethrough, repeatedly onto and over the surface of said exothermal reaction medium, said continuous air recirculation loop including an internal segment within said reaction zone and comprising the surface of any exothermal reaction medium contained therein, and an external segment to complete the loop exterior of said reaction zone and recycling from thus defined reaction zone outlet to reaction zone inlet; (ii) separating at least a portion of said entrained vapors and off-gases from said recirculating cooling air at a given point along said external segment; (iii) discharging a minor amount of the recirculating cooling air from said external segment of the loop at a point downstream from said separation (ii); and (iv) introducing a minor amount of fresh cooling air into the loop, either into said external segment thereof at any point downstream from the discharge (iii), or into said internal segment itself.

2. The process as defined by claim 1, wherein the temperature of the cooling air in the internal segment of the recirculation loop rises to substantially the same temperature as that of the exothermal reaction medium.

3. The process as defined by claim 2, the separation step (ii) further comprising a cooling of the recirculating cooling air.

4. The process as defined by claim 3, said separation/cooling being effected by condensation.

5. The process as defined by claim 4, said condensation being effected by contacting the recirculating cooling air with water.

6. The process as defined by claim 5, said condensation being effected in a condenser, and further comprising the discharge therefrom of the water utilized for condensation, together with any products of condensation.

7. The process as defined by claim 6, said condenser being a countercurrent water spray condenser.

8. The process as defined by claim 6, said condenser being a cocurrent water spray condenser.

9. The process as defined by claim 6, said condenser comprising a vacuum cyclone column not adapted for recirculation of the cooling water.

10. The process as defined by any of claims 2, 4 or 6, further comprising purifying the minor amount of recirculating cooling air prior to the discharge (iii) thereof.

11. The process as defined by any of claims 2, 4 or 6, further comprising both purifying and cooling the minor amount of recirculating cooling air prior to the discharge (iii) thereof.

12. The process as defined by claim 10, said purification comprising a water washing.

13. The process as defined by claim 10, the discharge (iii) being to ambient.

14. The process as defined by any of claims 2, 4 or 6, said introducing (iv) being into the external segment of the loop.

15. The process as defined by any of claims 2, 4 or 6, said introducing (iv) being into the internal segment of the loop.

16. The process as defined by claim 10, said introducing (iv) being into the external segment of the loop.

17. The process as defined by claim 10, said introducing (iv) being into the internal segment of the loop.

18. The process as defined by any of claims 2, 4 or 6, further comprising scrubbing the recirculating cooling air with water downstream from said reaction zone outlet but upstream from said separating (iii).

19. The process as defined by claim 18, said scrubbing being via cocurrent water spray.

20. The process as defined by any of claims 2, 4 or 6, wherein the recirculating cooling air is saturated with vapors and off-gases evolved from the exothermal reaction medium.

21. The process as defined by claim 1, wherein the separation (ii) is effected by scrubbing the recirculating cooling air with sulfuric acid.

22. The process as defined by claim 1, further comprising recycling the sulfuric acid utilized for the separation (ii) to the digestion reaction medium.

23. The process of claim 1 wherein the separating step (ii) is carried out with water that is used for the filtration of gypsum that is a by-product of said wet-process phosphoric acid production.

* * * * *